(12) United States Patent
Yin

(10) Patent No.: US 9,151,271 B2
(45) Date of Patent: Oct. 6, 2015

(54) CONTROL SYSTEM FOR A WIND PARK

(71) Applicant: Bo Yin, Brande (DK)

(72) Inventor: Bo Yin, Brande (DK)

(73) Assignee: SIEMENS AKTIENGESELLSCAHFT, München (DE)

( * ) Notice: Subject to any disclaimer, the term of this patent is extended or adjusted under 35 U.S.C. 154(b) by 449 days.

(21) Appl. No.: 13/681,568

(22) Filed: Nov. 20, 2012

(65) Prior Publication Data

US 2013/0140817 A1 Jun. 6, 2013

(30) Foreign Application Priority Data

Dec. 1, 2011 (EP) .................................. 11191600

(51) Int. Cl.
| | | |
|---|---|---|
| F03D 7/00 | (2006.01) | |
| F03D 7/04 | (2006.01) | |
| F03D 9/00 | (2006.01) | |
| H02J 3/38 | (2006.01) | |

(52) U.S. Cl.
CPC *F03D 7/00* (2013.01); *F03D 7/047* (2013.01); *F03D 7/048* (2013.01); *F03D 9/003* (2013.01); *F03D 9/005* (2013.01); *H02J 3/386* (2013.01); *Y02E 10/723* (2013.01); *Y02E 10/763* (2013.01)

(58) Field of Classification Search
CPC ........... F03D 7/00; F03D 7/047; F03D 9/003; F03D 7/048; F03D 9/005; H02J 3/386; Y02E 10/763; Y02E 10/723
See application file for complete search history.

(56) References Cited

U.S. PATENT DOCUMENTS

| | | | | |
|---|---|---|---|---|
| 7,119,452 | B2 * | 10/2006 | Larsen | 290/55 |
| 7,513,911 | B2 * | 4/2009 | Lambrecht et al. | 623/17.11 |
| 7,761,190 | B2 * | 7/2010 | Delmerico et al. | 700/297 |
| 7,898,100 | B2 * | 3/2011 | Andersen et al. | 290/44 |
| 8,095,244 | B2 * | 1/2012 | Morjaria et al. | 700/287 |
| 8,312,062 | B1 * | 11/2012 | Spivak et al. | 707/814 |
| 8,694,173 | B2 * | 4/2014 | Lovmand et al. | 700/287 |
| 8,810,211 | B2 * | 8/2014 | Andresen et al. | 323/207 |
| 2008/0106098 | A1 * | 5/2008 | Miller et al. | 290/44 |
| 2008/0150283 | A1 | 6/2008 | Acedo | |
| 2010/0025995 | A1 * | 2/2010 | Lang et al. | 290/44 |
| 2010/0312410 | A1 * | 12/2010 | Nielsen | 700/287 |
| 2011/0057444 | A1 * | 3/2011 | Dai et al. | 290/44 |
| 2011/0166717 | A1 | 7/2011 | Yasugi | |

FOREIGN PATENT DOCUMENTS

| | | |
|---|---|---|
| EP | 1512869 A1 | 3/2005 |
| EP | 2175540 A2 | 4/2010 |

* cited by examiner

*Primary Examiner* — Ramesh Patel

(57) ABSTRACT

A control system for a wind park includes a plurality of limit controllers. Each limit controller is configured to output a limit value set based upon a specific grid code requirement. A selection unit compiles a limit value set from the plurality of limit value sets according to a number of grid code requirements. The control system further includes a plurality of main controllers, wherein a main controller is configured to generate a setpoint for one or more wind turbines of the wind park according to the compiled limit value set. Further, a wind park and a method of controlling a wind park are provided.

14 Claims, 3 Drawing Sheets

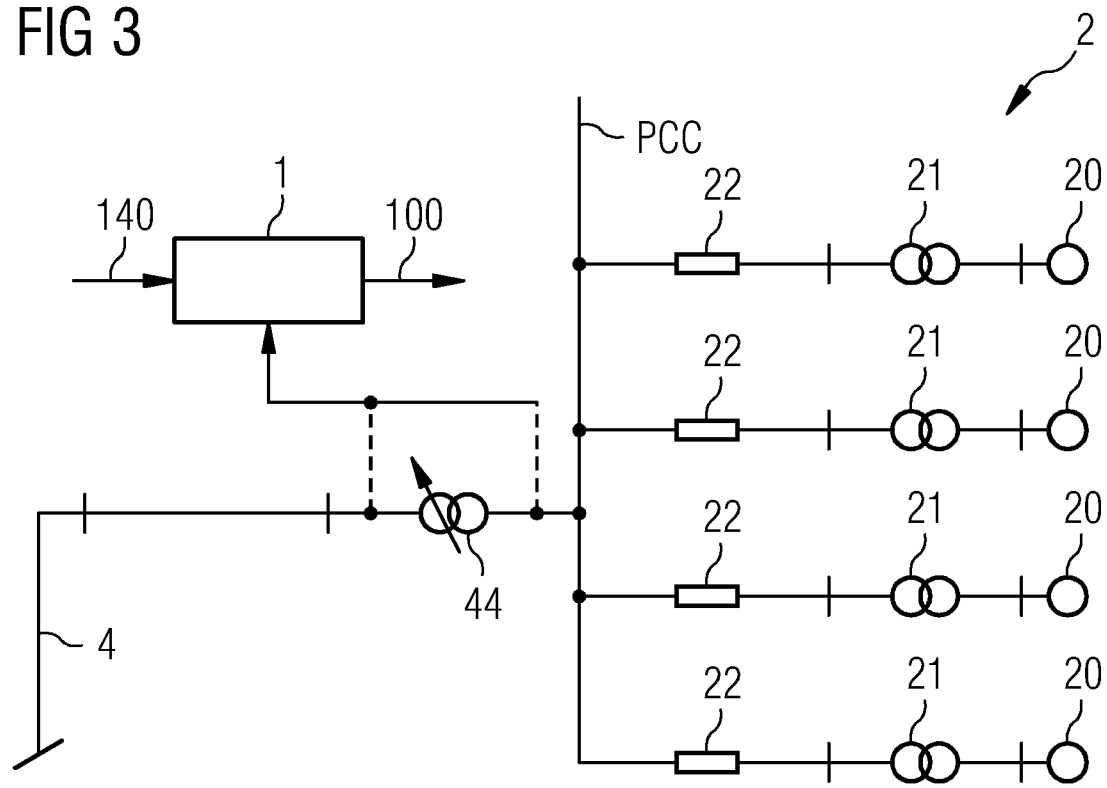

CONTROL SYSTEM FOR A WIND PARK

CROSS REFERENCE TO RELATED APPLICATIONS

This application claims priority of European Patent Application No. 11191600.3 EP filed Dec. 1, 2011. All of the applications are incorporated by reference herein in their entirety.

FIELD OF INVENTION

A control system for a wind turbine, a wind park, and a method of controlling a wind park are provided.

BACKGROUND OF INVENTION

A wind park generally comprises a plurality of wind turbines to generate output power that is usually fed into a grid for distribution to one or more population centers or industrial regions. Because of the fluctuating nature of the energy source, namely the wind, the output of each wind turbine can fluctuate, and the output of the wind park as a whole will also fluctuate.

However, to ensure that a wind park may feed into a grid, the wind park must comply with certain grid codes at the point of common coupling or point of common connection (PCC). The PCC is the point at which the local regulation or grid code requirements should be satisfied. Electric properties at the point of common connection may be directly or indirectly controlled by a park controller (also referred to as "park pilot", "wind farm controller", "high-performance park pilot (HPPP)") to satisfy particular requirements.

Different countries or regions can have different grid code requirements. To this end, the park controller monitors the output of the wind park and generates (or "dispatches") setpoints to the controllers of the wind turbines on the basis of the monitored output. As "setpoint" is to be understood a value or set of values that is used as a reference by a wind turbine controller. The park pilot can therefore monitor the overall performance of the wind park and manage the wind turbine controllers accordingly.

In the known control systems, a grid code specifies requirements for various operating parameters such as allowed operating power factor range, allowed operating voltage range, etc. For example, a grid code might require that the power factor should be within a range of 0.95 inductive and 0.95 capacitive and that the voltage at PCC point remain within 0.95 and 1.05 of the nominal voltage. During operation, the prior art control system monitors the output of the wind park and adjusts a setpoint which will be dispatched to wind turbines of the wind farm on the basis of a main control mode. A limit controller or "limitation controller" will generate a limit set consisting of an upper bound limit and a lower bound limit, and will forward this to the main controller.

The setpoint generated by the main controller will be constrained by the upper and lower bound limits delivered by the limit controller. For example, a known type of park pilot can operate in only one of two modes at any one time—a voltage limitation mode or a power factor limitation mode, and therefore comprises a voltage limitation controller and a power factor limitation controller. When working in voltage limitation mode, the park pilot observes the output voltage at the PCC, determines whether or not this is within the specified range, and the voltage limitation controller will generate a limit set which will be used as a constraint for the setpoint generated by the main controller. The resulting setpoint is sent to the wind turbines of the wind park. At some point, the park pilot changes over into power factor limitation mode, monitors the power factor, determines whether or not this is within the specified range, and the power factor limitation controller will provide a new limit set and use this as a constraint for the setpoints of the its main controller. The resulting setpoint is issued or dispatched to the wind turbines of the wind park. Characteristic of this known type of control system is that the control system can only work in one mode at any one time, and only one aspect of the grid requirement can be considered while the park pilot operates in that mode. Therefore, a known control system can fail to simultaneously fulfill multiple grid code requirements. In the example given above, the setpoint generated during voltage limitation mode may result in a power factor that does not comply with the power factor grid code requirement. In the same way, the setpoint generated during power factor limitation mode may result in a voltage that does not comply with the voltage grid code requirement.

SUMMARY OF INVENTION

It is an object to provide an improved control system for a wind park. This object is achieved by a control system, by a wind park and by a method of controlling a wind park as claimed in the claims.

The control system for a wind park comprises a plurality of "add-on" limit controllers, wherein each limit controller is realized to output a limit value set on the basis of a specific grid code requirement; a selection unit for compiling a limit value set from the plurality of limit value sets output by the limit controllers according to a number of grid code requirements or specific grid code regulations; and a number of main controllers, wherein a main controller is realized to generate a setpoint for one or more wind turbines of the wind park, and the setpoint is limited by the compiled limit value set.

Here, the term "add-on" is used in the sense that a limit controller can be simply "added" to the functionality of the control system, but does not need to be an integral part of the control system. Therefore, an add-on limit controller can easily be included in or removed from the control system as required, for example by a hardware or software switch, as will be explained below. An advantage of the control system is that any number of add-on limit controllers can be used, and each of these can generate a limit value set, and the selection unit can compile a limit value set using the limit value sets output by the plurality of limit controllers according to several grid code requirements. The new limit value set compiled in this manner is used as the basis for limiting a setpoint for the wind park output. Therefore, using the control system, the wind park can be managed so that its output fulfils more than one grid code requirement at any one time. The term "set" is used in its usual context, and can comprise one or more values. The term "compile" is used in the sense that the selection unit considers the limit values of the plurality of sets delivered to it by the limit controllers, so that the compiled limit value set can comprise one or more limit values selected from the different limit value sets.

The claimed wind park comprises a control system such that several grid code requirements may be satisfied simultaneously at the point of common connection.

The claimed method of controlling a wind park comprises the steps of generating a plurality of limit value sets, wherein a limit value set is generated on the basis of a specific grid code requirement; compiling a limit value set from the plurality of limit value sets according to a number of grid code requirements; and limiting a setpoint generated by the main controller for one or more wind turbines of the wind park according to the compiled limit value set.

Embodiments and features are given by the dependent claims and as revealed in the following description. Features of different claim categories may be combined as appropriate to give further embodiments not described herein.

Generally, a control system for a wind park is referred to as a "park pilot". Therefore, in the following, these terms may be used interchangeably. The purpose of the park pilot is to monitor certain variables at the point of common connection—for example voltage, reactive power and active power, compare them with the pre-defined grid requirement and issue updated setpoints for the controllers of each wind turbine. The wind turbines of the wind park regulate their variables according to the issued setpoints in order to operate at a desired voltage or to deliver a desired reactive power into the point of common connection such that a grid requirement at PCC can be satisfied.

As mentioned above, there are several factors or operating parameters that must be considered in the control of a wind park. For example, the output voltage should lie within a certain range, the power factor should not drop below a minimum value, the reactive power should lie within a certain range, etc.

In an embodiment, a limit controller comprises any of a voltage limit controller, a power factor limit controller, a reactive power limit controller, or other type of limit controller. One of each type is preferably used. As mentioned above, the purpose of a limit controller is to determine an optimal range or an optimal value for its operating parameter, and a limit controller preferably adjusts its limit value set dynamically in response to a momentary monitored output of the wind park. By using several such limit controllers, the control system may manage several operating parameters simultaneously so that the limit value set delivered by a limit controller allows the main controller to dispatch a setpoint which may satisfy multiple grid code requirements simultaneously.

A main controller may be configured to generate a setpoint for a particular operating variable. Generally, a park pilot will comprise more than one main controller. However, only one of main controllers can operate at one time. Therefore, in a further preferred embodiment, the control system comprises a plurality of main controllers, wherein a main controller can be any of a voltage controller, a reactive power controller, a power factor controller, or other type of main controller. For example, a park pilot may comprise two main controllers. Either one of these two main controllers may be enabled at any time, wherein the setpoint output by that enabled or active main controller will be dispatched to the wind park.

A main controller may generate a new or updated setpoint value using single limit values delivered by the limit controllers. However, more flexible control is possible if the main controller can base its calculations on a range of values delivered by each limit controller. Therefore, in another embodiment, a limit controller is configured to generate a pair of limit values, wherein a limit value pair comprises a lower limit value and an upper limit value. These lower and upper limit values therefore define a range of values bounded by the upper and lower limits. Preferably, a compiled limit value set comprises a lower limit value selected from the plurality of lower limit values and an upper limit value from the plurality of upper limit values. As mentioned above, a park pilot generally generates a voltage setpoint for a wind turbine controller, whereby a voltage setpoint can be understood as a "target" for the voltage output of the wind turbine and an allowed range above and below this target, within which the output voltage may lie. Therefore, the limit controllers are preferably configured to output lower and upper limit values for a voltage range. For example, three limit controllers can deliver three different sets of upper and lower limit values. One set might lie within both other sets, i.e. its range is common to all three limit value sets, and this set would be presented to the main controller. In this way, the main controller can update its setpoint using a limit value set that will allow the wind farm output to satisfy all relevant grid code requirements.

The control system may be realized to include a plurality of limit controllers to cover the different grid code requirements of various countries or regions. Of course, not every country's grid code requirements will require all of the limit controllers. A control system might be configured such that certain limit controllers are active or enabled according to the requirements of the country or region in which the control system is to be used.

In another embodiment, in order to obtain a greater degree of flexibility, the control system comprises a switching unit for connecting the output of a limit controller to the selection unit and for disconnecting the output of that limit controller from the selection unit. In this way, a required or desired combination of limit controllers can be enabled or activated in a modular manner as required. Such a control system can therefore be used in any country or region for any combination of grid code requirements.

Furthermore, should the grid code requirements be altered at any time for an already operational control system, the park pilot may be reconfigured accordingly by simply activating ("adding on") one or more of the limit controllers, as required, or deactivating one or more of them, as appropriate. To this end, the control system preferably comprises an interface for obtaining information related to the grid code applicable for the environment in which the control system is to be used. The interface can be realized as a way of inputting a suitable command, for example to a switching unit, in order to activate the relevant limit controllers and deactivate any limit controllers that are not required.

The switching unit is preferably configured to connect the outputs of at least two limit controllers simultaneously to the selection unit, so that the park pilot can always control the wind park to fulfill at least two grid code requirements. For example, if three or four limit controllers are "active", i.e. their output limit value sets are routed through to the selection unit, the main controller can generate a setpoint that will allow the simultaneous fulfillment of three or four grid code requirements, respectively.

The selection unit may compile a limit value set in a number of ways. For example, in one embodiment, if the limit controllers produce limit value pairs, the selection unit is realized to choose the lowest of the lower limit values and the highest of the upper limit values.

During operation of the wind park, situations might arise in which a limit controller reacts to the prevalent conditions to generate limit values that would conflict or be incompatible with the limit values of the other limit controllers. For example, the lower limit value from one limit controller could be higher than the higher limit value from the other limit controller, so that one there is no limit value set that can satisfy both requirements. In such a situation, even though neither limit value set is optimal, one of the limit value sets might be more preferable than the other.

Therefore, in a preferred embodiment, the control system comprises a ranking unit for assigning a distinct rank to each of a plurality of limit controllers, so that a higher ranking limit value set is preferred over a lower ranking limit value set in the event of such a conflict. Information about such preferences can be entered into the system in a once-off configuration step, or in an ad-ho manner during operation of the wind farm.

In another embodiment, a limit controller comprises a computer program product or software module configured to run on a processor of a programmable device. Similarly, the selection unit and the switching unit may be configured as software modules. In this way, an existing park pilot may be upgraded or reprogrammed with relatively little effort and cost to give the improved control system.

In one embodiment of the method, a switching unit is controlled to connect the output of a limit controller to the selection unit or to disconnect the output of that limit controller from the selection unit according to a grid code requirement. As mentioned above, the switching unit may be realized as a software module, so that the step of controlling the switching unit can simply involve issuing appropriate commands to the switching unit.

The selection unit may compile a limit value set in a number of different ways. For example, in one preferred embodiment, the step of compiling a limit value set comprises selecting the lowest value of the plurality of lower limit values and the highest value of the plurality of upper limit values.

As mentioned above, limit controllers may be assigned different ranks according to their importance or relevance. Therefore, in another preferred embodiment, the step of selecting a limit value comprises evaluating the rank of each limit controller and compiling a limit value set on the basis of the ranks of the limit controllers. For example, it may be that the output limit value pairs of two limit controllers contradict each other, i.e. the upper limit value of one limit controller is lower than the lower limit value of another limit controller. In this case, the selection unit would evaluate the ranks of these limit controllers, and would disregard the limit values of the lower ranked limit controller, so that a conflict is avoided.

Other objects and features will become apparent from the following detailed descriptions considered in conjunction with the accompanying drawings. It is to be understood, however, that the drawings are designed solely for the purposes of illustration and not as a definition of the limits of the invention.

BRIEF DESCRIPTION OF THE DRAWINGS

FIG. 3 shows a control system in relation to a wind park and a utility grid.

In the diagrams, like numbers refer to like objects throughout. Objects in the diagrams are not necessarily drawn to scale.

DETAILED DESCRIPTION OF INVENTION

Figure 1:
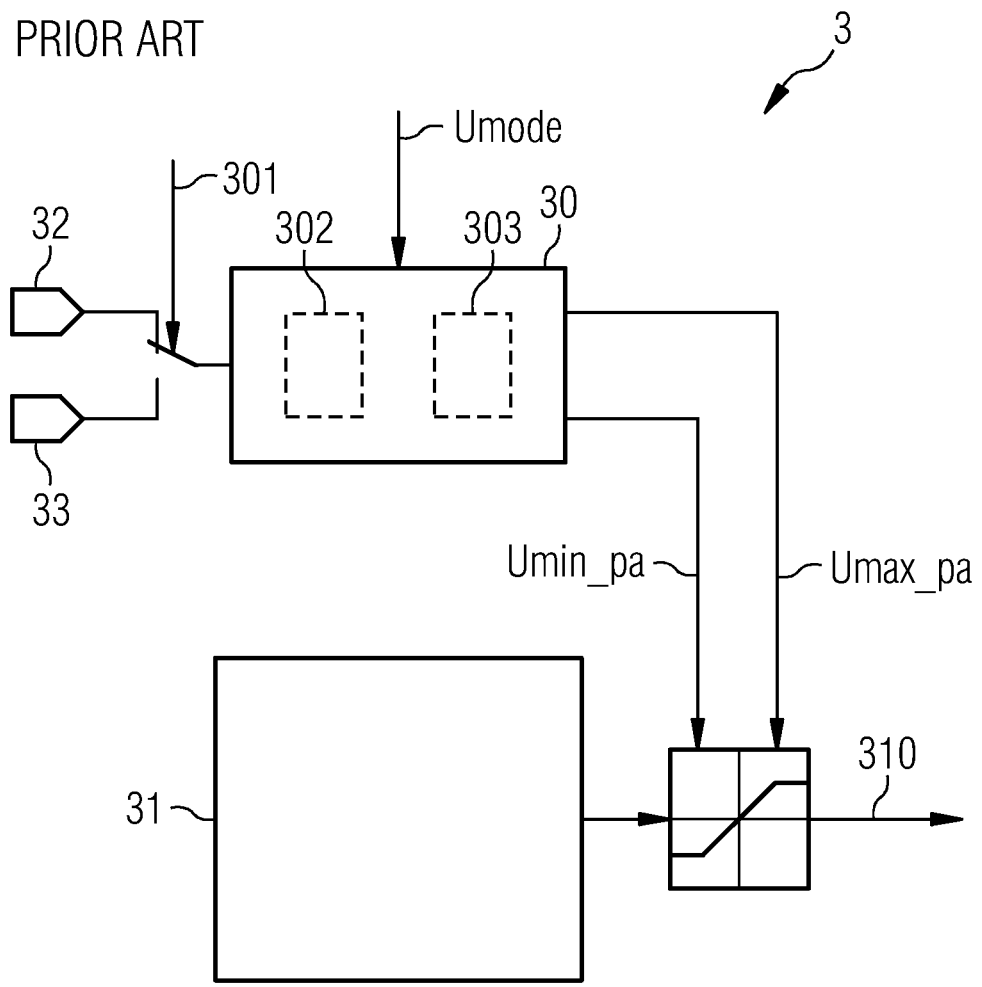
FIG. 1 shows a block diagram of a prior art wind park control system.

FIG. 1 shows a block diagram of a prior art control system 3 for a wind park, comprising a main controller 31, in this case a voltage controller 31. Here, the grid code requires that reactive power should lie within a certain band or range, and also that the power factor should be above a certain threshold. These requirements are defined by a reactive limit percentage parameter 32 and a reactive limit power factor parameter 33, respectively.

In this example, the limitation mode can be either a reactive power limitation mode or power factor limitation mode, and the choice is made by means of a limitation mode selector 301, which determines which grid code requirement is to be used by a limit determination unit 30, i.e. which of a reactive power limit determination unit 302 or a power factor limit determination unit 303 is to be used. The limitation mode input 301 can be specified by, for example, a grid operator or transmission system operator. The limit determination unit 30 uses the input parameters 32, 33 to determine a new set of values for a lower voltage limit Umin_pa and an upper voltage limit Umax_pa, and these limits are used to adjust the setpoint 310 issued by the main controller 31.

When the limitation mode input 301 specifies voltage control on the basis of the reactive power limit, only the corresponding reactive power limit value 32 is considered. If the reactive power exceeds this threshold or limit value, the limit determination unit 30 will respond by generating a new lower limit Umin_pa and upper limit Umax_pa for the main controller 31. Accordingly, the main controller 31 alters the voltage setpoint 310 for the wind park, with the result that the reactive power is "pushed back" to its reference.

When the limitation mode input 301 specifies a power factor limitation mode, only the corresponding power factor limit value 33 is considered. If the power factor is lower than this threshold or limit value 33, the limit determination unit 30 will respond by generating a new lower limit Umin_pa and upper limit Umax_pa for the voltage setpoint 310 generated by the main controller 31, with the aim of increasing the power factor.

The main controller 31 of the prior art control system 3 uses the values Umin_pa, Umax_pa delivered by the limit determination unit 30 as minimum Umin and maximum Umax voltages of the voltage setpoint 310, as indicated by the "saturation" symbol. The updated voltage setpoint 310 ensures that the output voltage of the wind park lies within that minimum and maximum. Clearly, the main controller 31 can only react to one of the input parameters 32, 33 at a time, in this case either to the power factor limit 33 or to the reactive power limit 32, and the lower and upper limits Umin_pa, Umax_pa for the main controller 31 are determined on the basis of that one input parameter. Therefore, the situation may arise in which one grid code requirement is being fulfilled, while the other is not being fulfilled. As a result, a grid controller or transmission system operator may be compelled to carry out adjustments to the operating parameters of the control system in an attempt to fulfill both grid code requirements.

Figure 2:
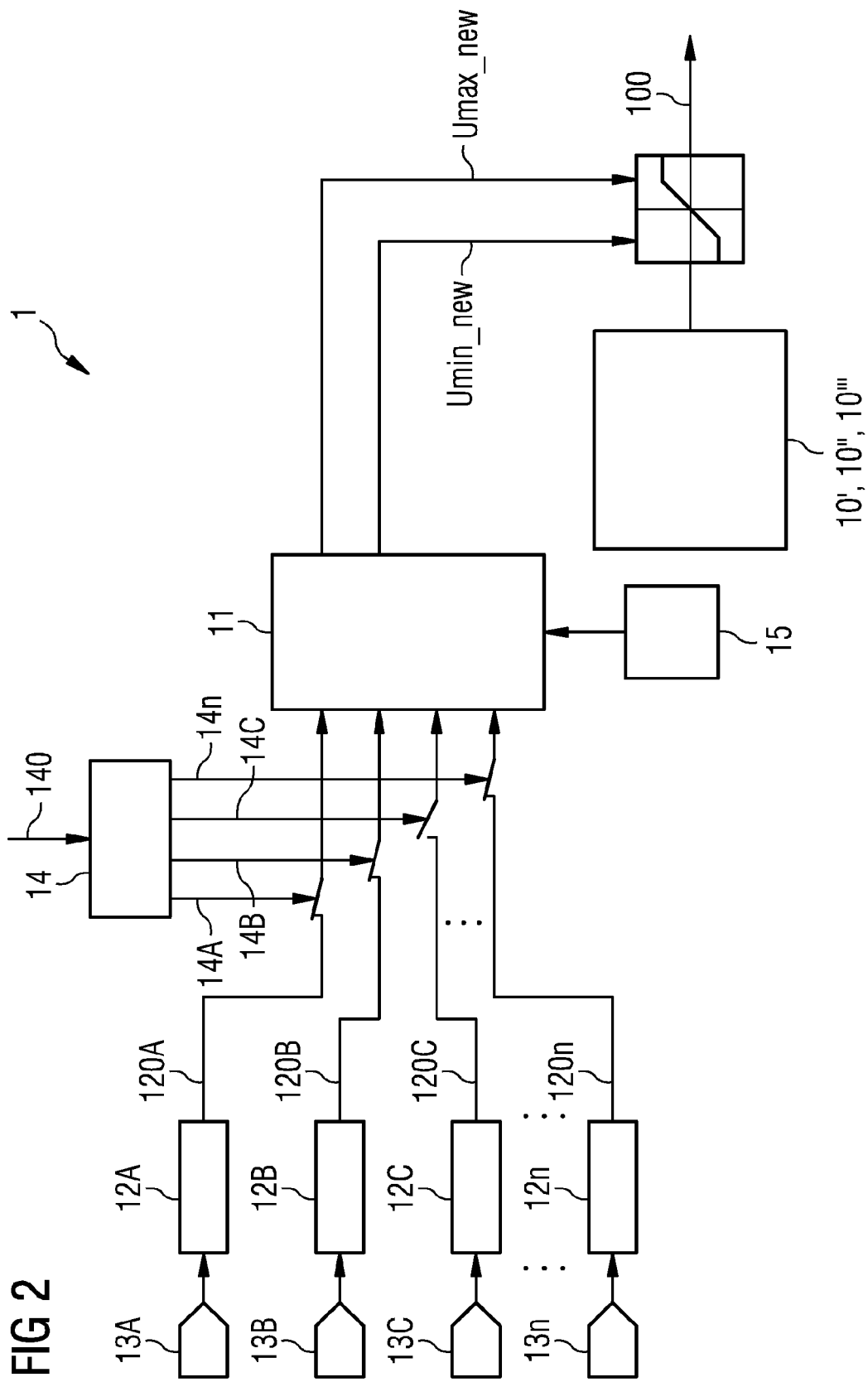
FIG. 2 shows a block diagram of a control system 1 according to an embodiment.

FIG. 2 shows a block diagram of a control system 1. This control system 1, as part of the park pilot of a wind park, could fulfill several grid code requirements simultaneously.

Various limits or limit parameters 13A, 13B, 13C, . . . , 13n are input to the system, for example a voltage limit 13A, a reactive power limit 13B, a power factor limit 13C, etc. Each limit parameter 13A, 13B, 13C, . . . , 13n is input to a corresponding limit controller 12A, 12B, 12C, 12n. In this embodiment, each add-on limit controller 12A, 12B, 12C, 12n generates a set comprising a pair 120A, 120B, 120C, 120n of voltage limit values, i.e. a voltage limit lower value and a voltage limit upper value. Each pair 120A, 120B, 120C, 120n defines an optimal range for the grid code requirement managed by the corresponding limit controller 12A, 12B, 12C, 12n.

A switching unit 14 determines which voltage limit value pairs 120A, 120B, 120C, . . . , 120n are forwarded to a selection unit 11. To this end, the switching unit 14 generates enable signals 14A, 14B, 14C, . . . , 14n, whereby each enable signal 14A, 14B, 14C, . . . , 14n switches a particular limit value pair through to a selection unit 11, or disconnects it from the selection unit 11. The diagram indicates "switches", but it is to be understood that the switching or enabling can be carried out in software. The switching unit 14 is programmed according to any relevant country or region grid code requirements that should be fulfilled by that wind park. For example, a mode select input 140 can determine which "switches" are to be closed or opened, and therefore which limit value set is routed to a selection unit 11 or not. Here, limit controllers 12A, 12B and 12n are required by the park pilot in order to fulfil the applicable grid code requirements. Therefore, the limit value sets 120A, 120B, 120n are relevant and are switched through. Limit controller 12C is not required by the park pilot in order to fulfil the applicable grid code requirements, so that limit value set 120C are not regarded as relevant and are therefore not switched through to the selection unit 11.

The enabled or selected voltage limit value pairs 120A, 120B, 120n are forwarded to a selection unit 11. The selection unit 11 can choose a lower limit value and an upper limit value from the plurality of input pairs 120A, 120B, 120n. In this embodiment of the control system 1, a ranking unit 15 is used to assign priorities or ranks to the active limit controllers 12A, 12B, 12n. According to the assigned ranks, the selection unit 11 compiles a pair of voltage limit values Umin_new, Umax_new and forwards these to the main controller 10. Here, the main controller 10 is a voltage controller 10, which uses the values Umin_new, Umax_new delivered by the selection unit 11 as limiting minimum (Umin) and maximum (Umax) voltages for the setpoint 100, as indicated by the "saturation" in the diagram. The control system 1 can comprise several different main controllers, one of which is enabled at any one time. Here, the control system 1, in addition to the voltage main controller 10, also comprises a power factor main controller 10', and a reactive power main controller 10". Other types of main controller could also be included in the control system 1. The data supplied by the selection unit 11 is used to limit the setpoint 100 delivered by a main controller 10, 10', 10".

FIG. 3 is a simplified block diagram showing a control system 1 in relation to a wind park 2 and a utility grid 4. The wind park 2 comprises any number of wind turbines 20 that generate output power which is fed into a grid through wind turbine transformers 21 and a wind park or grid-side transformer 44. Each power line between a wind turbine transformer and the park-side bus has a certain line impedance 22. The characteristics of the wind park 2, i.e. the power output by each turbine 20 and the magnitudes of the line impedances 22 will govern the voltage that can be collected at a PCC and fed into a grid-side transformer 44. The park pilot 1 or control system 1 responds to the momentary output of the wind park—for example to the voltage or reactive power measured at the point of common connection PCC—and continually updates a setpoint 100 for each wind turbine 20. In addition, the park pilot 1 must fulfill certain grid code requirements 40. These are input to the park pilot 1, for example by means of a mode select input 140 in a configuration step, and determine the limit parameters 13A, 13B, 13C, ..., 13n that are used as inputs to the limit controller 12A, 12B, 12C, 12n of the control system 1, as described in FIG. 2 above.

Although the present invention has been disclosed in the form of preferred embodiments and variations thereon, it will be understood that numerous additional modifications and variations could be made thereto without departing from the scope of the invention. For example, the control system may be used to control a "wind park" consisting of a single wind turbine, for example in the case that a wind turbine is to be used as a local power source, for example for relatively small population in a remote area.

Furthermore, even if pairs of limit values were used in the above to illustrate the control system, it is to be understood that a limit controller can be realized to generate only a single limit value, or a limit value representing a range or span, or any other number of limit values. Equally, the selection unit may be configured to evaluate or compare matching or equivalent limit values when the limit controllers deliver sets comprising several different types of limit values.

For the sake of clarity, it is to be understood that the use of "a" or "an" throughout this application does not exclude a plurality, and "comprising" does not exclude other steps or elements. Any reference to a unit or a module does not preclude the existence of multiple units or modules.

The invention claimed is:

1. A control system for a wind park, comprising
 a plurality of limit controllers, wherein each limit controller is configured to output a limit value set based upon a specific grid code requirement;
 a selection unit for compiling a limit value set based upon the plurality of limit value sets according to a plurality of grid code requirements; and
 a main controller configured to generate a setpoint for one or more wind turbines of the wind park according to the compiled limit value set.

2. The control system according to claim 1, wherein each limit controller is selected from the group consisting of a voltage limit controller, a power factor limit controller, a reactive power limit controller, and a combination thereof.

3. The control system according to claim 1, further comprising:
 a plurality of main controllers, wherein each main controller is selected from the group consisting of a voltage controller, a reactive power controller, a power factor controller, and a combination thereof.

4. The control system according to claim 1, wherein a limit controller generates a pair of limit values, wherein a limit value pair comprises a lower limit value and an upper limit value.

5. The control system according to claim 4, wherein a compiled limit value set comprises a lower limit value selected from a plurality of lower limit values and an upper limit value from a plurality of upper limit values.

6. The control system according to claim 1, further comprising:
 a switching unit for connecting or disconnecting an output of a limit controller to or from the selection unit.

7. The control system according to claim 6, wherein the switching unit is configured to connect outputs of at least two limit controllers simultaneously to the selection unit.

8. The control system according to claim 1, further comprising:
 a ranking unit for assigning a distinct rank to each of a plurality of limit controllers.

9. The control system according to claim 1, further comprising:
 an interface for obtaining information related to a grid code applicable for an environment in which the control system is to be used.

10. A wind park, comprising:
 a control system according to claim 1.

11. A method of controlling a wind park, comprising:
 generating a plurality of limit value sets, wherein a limit value set is generated based upon a specific grid code requirement,
 compiling a limit value set from a plurality of limit value sets according to a plurality of grid code requirements, and generating a setpoint for one or more wind turbines of the wind park based upon the compiled limit value set.

12. The method according to claim 11, further comprising:
controlling a switching unit to
connect a limit value set to a selection unit or
disconnect a limit value set from the selection unit according to a grid code requirement.

13. The method according to claim 11, wherein the compiling of the limit value set comprises selecting a lowest value of a plurality of lower limit values and a highest value of a plurality of upper limit values.

14. The method according to claim 13, further comprising:
providing and using a plurality of limit controllers for generating the plurality of limit value sets, wherein the selecting of the lowest limit value and the highest limit value comprises evaluating a rank for each limit controller.

* * * * *